No. 781,363. Patented January 31, 1905.

UNITED STATES PATENT OFFICE.

MARIE RITTER, OF BRESLAU, GERMANY.

PROCESS OF MAKING MEDICAMENTS CONTAINING PLANT-JUICE.

SPECIFICATION forming part of Letters Patent No. 781,363, dated January 31, 1905.

Application filed November 14, 1901. Serial No. 82,307.

*To all whom it may concern:*

Be it known that I, MARIE RITTER, a subject of the Emperor of Germany, residing at 4 Schillerstrasse, Breslau, in the Empire of Germany, have invented a certain new and useful Procedure for Preserving and Improving the Medical Power of Juices of Plants, of which the following is a specification.

Numerous juices of plants have a strong influence upon the animal and human organism, specially by agitating the nerves of it, and they are therefore used as medicaments. The medical power, however, diminishes regularly if the juices are not utilized fresh and finishes often entirely after a proportionately short time.

This invention refers to a procedure to set aside this inconvenience from the sanative juices of plants and to preserve and improve the healing power for a considerably long time.

The new procedure consists in adding to the juices of plants containing living cells finely-divided light-bearers—*i. e.*, particles which have the capacity, if irradiated, to absorb ethereal vibrations, to keep them for a time, and to emit them again. Among such particles are well known specially the sulfids of barium, strontium, calcium, magnesium, potassium, and sodium; further, phosphorus and carbonate of lime alone or in mixture with magnesia, manganese, bismuth, and numerous other substances. Such light-bearers are to be found as well in the ashes of plants as in the seeds of plants, and with one preferred modification of my invention I add the necessary light-bearers to the juices of the plants in form of ashes of plants or flour made from seed of plants.

Performing my invention I proceed as follows: I grind well fresh-plucked plants, so that they form a pap. Then I add to two hundred and fifty parts of plants twenty-five parts of the ashes of the respective plants and twenty-five parts of flour made from seed of the plants. Hereafter the compound is for a time exposed to the power of sun-rays concentrated through a burning-lens. Then I fill up with distilled water and expose the mixture again and continually to the sun-rays. This done, I clear the liquid and join alcohol to it to keep it free from decomposing bacteria and mildew.

The performance of the procedure can be variously modified. Instead of grinding the plants alone I can grind them with light-bearers together or I can add concentrated juice of the plants to the light-bearers and use the produced compound either direct or after composition with water and alcohol. Instead of sunlight I can adopt other sorts of light—for instance, electric light and other sorts of rays. It is not always necessary to concentrate the sun-rays through a burning-lens, especially in those cases where products of less efficiency are desired.

As the different light-bearers emit vibrations of different wave lengths and of different intensity, I can strengthen the operation of the light-bearers added to the plant-juices if I at same time undermix several light-bearers; so, *e. g.*, I can add to the juices of plants, besides of plant-ashes which contain potassium and sodium salts, calcium sulfid and magnesia.

The preparations of plants which form the object of my invention have, in consequence of the admixed light bearers, the property to radiate longer or shorter time in the dark after having been exposed to radiation by light or other rays.

Having now particularly described and ascertained the nature of the said invention and in what manner the same is to be performed, I declare that what I claim is—

1. The process of making a medicament containing plant-juice which consists in separating juices from plants containing living cells, at ordinary or low temperature, and mixing the same with finely-divided particles which are capable of absorbing rays and emitting them again in a dark room, for substantially the purposes set forth.

2. The process of making a medicament containing plant-juice, which consists in separating juices from fresh-plucked plants containing living cells, at ordinary or low temperature, and mixing the same with finely-divided particles which are capable of absorbing rays and emitting them again in a dark room, for substantially the purposes set forth.

3. The process substantially as herein described for making a medicament containing plant-juice, which consists in powdering particles capable of absorbing rays and emitting them again in a dark room, exposing said particles to the radiation of rays, and then adding them to a mixture containing plant-juice.

4. The process substantially as herein described for making a medicament containing plant-juice, which consists in adding plant-ashes to a compound containing plant-juice.

5. The process of making a medicament containing plant-juice, which consists in adding plant-ashes, to a compound containing juices of the same kind of plant as that from which the plant-ashes have been formed and then adding water to the said compound, for substantially the purposes set forth.

6. The process substantially as herein described of making a medicament containing plant-juice, which consists in preparing particles capable of absorbing rays and emitting them again in a dark room, exposing said particles to the radiation of rays, mixing said particles with juices of plants containing living cells, adding water to the compound, and again exposing the liquid to the radiation of rays.

In testimony that I claim the foregoing as my invention I have signed my name in presence of two subscribing witnesses.

MARIE RITTER.

Witnesses:
HERMANN BARTSCH,
ALBERT SCHENK.